INVENTOR.
WILLIAM M. HALLIDY
ATTORNEYS

April 16, 1957　　　W. M. HALLIDY　　　2,789,265
ALTERNATOR-RECTIFIER GENERATING SYSTEM
Filed May 6, 1955　　　　　　　　　　　4 Sheets-Sheet 2

INVENTOR.
WILLIAM M. HALLIDY
BY
ATTORNEYS

April 16, 1957 W. M. HALLIDY 2,789,265
ALTERNATOR-RECTIFIER GENERATING SYSTEM
Filed May 6, 1955 4 Sheets-Sheet 3

INVENTOR.
WILLIAM M. HALLIDY
BY Hudson Doughton,
Williams, David & Hoffman
ATTORNEYS April 16, 1957 W. M. HALLIDY 2,789,265
ALTERNATOR-RECTIFIER GENERATING SYSTEM
Filed May 6, 1955 4 Sheets-Sheet 4

INVENTOR.
WILLIAM M. HALLIDY
BY Hudson, Boughton,
Williams, David & Hoffman
ATTORNEYS

United States Patent Office 2,789,265
Patented Apr. 16, 1957

2,789,265
ALTERNATOR-RECTIFIER GENERATING SYSTEM

William M. Hallidy, Lakewood, Ohio, assignor to The Leece-Neville Company, Cleveland, Ohio, a corporation of Ohio Application May 6, 1955, Serial No. 506,572

15 Claims. (Cl. 320—28)

This invention relates to generating systems for vehicles and, more particularly, to generating systems of the alternator-rectifier type.

In generating systems of the alternator-rectifier type which include a storage battery to be charged as a portion of the external load, the load circuit is usually connected with the direct current terminals of the power rectifier through a load relay. In such a system, it is desirable that the load relay be under the control of the alternator so that the relay will close and open automatically in response to a predetermined terminal voltage value of the alternator.

The most economical way of automatically closing the load relay in response to the operation of the alternator, would be to energize the load relay coil by a portion of the direct current output of the power rectifier, but when the load relay coil is energized in this way, the opening of the load relay is no longer under the control of the alternator. This results from the fact that as soon as the relay is closed by the alternator output voltage, its magnet coil will then be subject to energization from the battery and will hold the relay contacts closed after the alternator output voltage drops to zero value.

To accomplish the desired automatic control of the load relay by the alternator, it has heretofore been necessary to provide the system with an auxiliary or control rectifier as is shown in United States Patent No. 2,646,-543, granted July 21, 1953 for connecting the load relay magnet coil with the alternator. Such a control rectifier has added considerably to the cost of generating systems of this kind.

As its principal object, the present invention, therefore, provides a novel generating system of the alternator-rectifier type in which the above-explained cost disadvantage is overcome and in which the closing and opening of the load relay is automatically responsive to the operation of the alternator with the relay magnet coil being energized from the alternator through at least a portion of the power rectifier.

Another object is to provide such a generating system in which the energization of a relay magnet coil from the alternator takes place through one portion of the power rectifier while another portion of the power rectifier prevents energization of the relay magnet coil from the battery.

A further object is to provide a generating system of the kind above referred to in which the alternator is a three-phase alternator and the power rectifier is a multiple-cell full-wave rectifier.

The invention also contemplates as a further object thereof, a generating system of the alternator-rectifier type which includes an auxiliary or control rectifier in the load relay coil energizing circuit but in which the form of the load relay coil circuit is such as to include a portion of the power rectifier to thus permit the control rectifier to be of a relative simple and inexpensive character.

Still another object is to provide such an alternator-rectifier generating system in which the control rectifier used in combination with a portion of the full-wave power rectifier can be, as desired, either a single rectifier cell, a pair of such cells, or three such rectifier cells.

Yet another object is to provide an alternator-rectifier generating system of the kind above referred to in which the load relay magnet coil circuit includes a capacitor connected across the terminals of such coil.

Additionally, this invention provides a novel generating system of the kind having a storage battery connected with the generator through the series contacts of a conventional load relay or equivalent electromagnetic switch device and in which signal means, preferably an electric lamp, is connected in shunt relation across the series contacts of the load relay to be energized from the battery whenever the series contacts are open in indication of an open-circuit condition of the load circuit.

Other objects and advantages of this invention will be apparent in the following detailed specification and in the accompanying sheets of drawings forming a part of this specification and in which.

Figure 1:
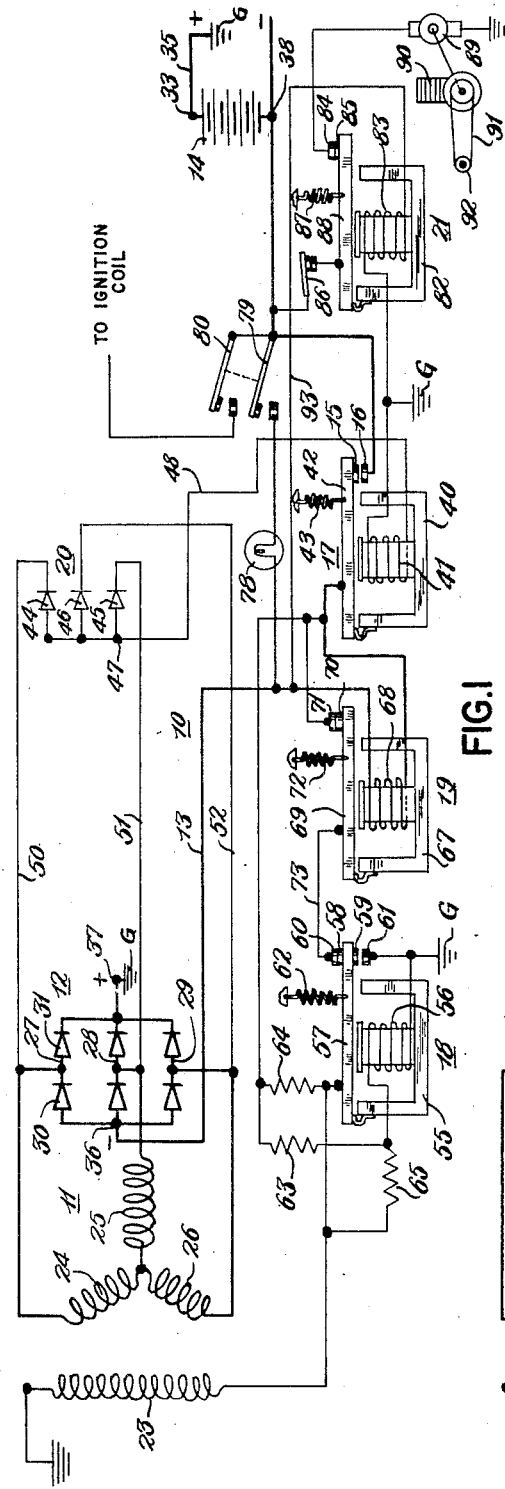
Fig. 1 is a wiring diagram illustrating an electrical generating system embodying the present invention.

As one practical embodiment of the invention, Fig. 1 illustrates a generating system 10 having an alternator 11 connected with an external direct current load through a main or power rectifier 12, and through a load conductor 13 and a common ground G. The external load includes a storage battery 14 which is connected with the power rectifier 12 by the conductor 13 through the series contacts 15 and 16 of a load relay 17. Other components of the generating system 10 include voltage and current regulators 18 and 19 of the relay type for controlling the operation of the alternator 11, an auxiliary or control rectifier 20 serving the load relay 17, and an auxiliary relay 21. These various components of the generating system 10 and their functioning therein will be further described hereinafter.

The alternator 11 is here shown as being a three-phase alternator having a field winding 23 and inductor windings 24, 25 and 26. The inductor windings are here shown as being Y-connected although this invention is also applicable to an alternator-rectifier system using a three-phase alternator having delta-connected inductor windings.

The power rectifier is a three-phase full-wave, multiple-cell rectifier of the dry-plate type and is here shown as having three parallel circuit arms 27, 28 and 29 with which the inductor windings 24, 25 and 26 of the alternator 11 are connected, respectively. Each of the circuit arms 27, 28 and 29 has a pair of rectifier cells 30 and 31 therein and the connection of each inductor winding of the alternator with its associated circuit arm of the rectifier is made at a point between such pair of rectifier cells.

The generating system 10 is here shown as being a system of the so-called positive-ground type in which the positive terminal 33 of the storage battery 14 is connected to the common ground G by the conductor 35. The power rectifier 12 further includes direct current load terminals 36 and 37 of which the terminal 37 is a positive terminal and is connected to the common ground. The negative direct current terminal 36 of the power rectifier 12 is connected with the negative terminal 38 of the battery 14 through the load conductor 13.

The load relay 17 is a conventional load relay comprising a magnet frame 40 having an energizing coil 41 thereon, and an armature 42 carrying the movable switch contact 15 and responsive to the energization of the magnet coil 41. The load relay contacts 15 and 16 are normally open for disconnecting the battery 14 from the alternator 11 and such open condition of these contacts is normally maintained by the tension spring 43.

The load relay coil 41 has one end thereof connected to the common ground G and its other end connected with the alternator 11 through the control rectifier 20 and through certain portions of the power rectifier 12. The control rectifier 20 is here shown as being a three cell rectifier consisting of three rectifier cells 44, 45 and 46 which are also of the above mentioned dry-plate type. The three control rectifier cells 44, 45 and 46 have a common direct current terminal 47 with which the ungrounded end of the load relay magnet coil 41 is connected by the conductor 48. The three cells 44, 45 and 46 of the control rectifier 20 are connected with the inductor windings 24, 25 and 26 of the alternator 11 by the conductors 50, 51 and 52, respectively.

The voltage regulator 18 can be of a conventional form and is here shown as being of the kind disclosed in and covered by United States Patent 2,520,689, granted August 29, 1950. The voltage regulator 18 comprises a frame 55 having a voltage magnet coil 56 thereon, and a vibratory armature 57 carrying movable switch contacts 58 and 59 which cooperate, respectively, with upper and lower stationary contacts 60 and 61. A tension spring 62 effective on the armature 57 urges the same toward a normally closed condition for the cooperating contacts 58 and 60.

The voltage regulator 18 also comprises a ballast resistor 63 in series circuit with the magnet coil 56, a point resistor 64 in shunt relation to the upper pair of cooperating contacts 58 and 60, and a secondary resistor 65 which assists the ballast resistor 63 in controlling the energization of the magnet coil 56.

The current regulator 19 can also be a conventional form of such a device and is here shown as comprising a magnet frame 67 having a series magnet coil 68 thereon, and a vibratory armature 69 carrying a movable switch contact 70 which is urged toward a normally closed engagement with a stationary contact 71 by the action of a tension spring 72 on the armature.

The point resistor 64 of the voltage regulator 18 also serves as a point resistor in shunt relation to the co-operating contacts 70 and 71 of the current regulator 19. The point resistor 64 and the voltage and current regulator contacts 58, 60 and 70, 71 are in the field circuit of the alternator 11 and control the energization of the field winding 23 in accordance with the terminal voltage and current output values of the alternator, as is understood by those skilled in this art.

The lower stationary voltage regulator contact 61 is connected with the common ground G and the upper stationary voltage regulator contact 60 is connected with the movable current regulator contact 70 by the conductor 73. Although the functioning of the voltage and current regulators 18 and 19 in controlling the operation of the alternator 11 is generally understood by those skilled in this art and need not be here described in detail, it can be mentioned, however, that whenever the contacts 58 and 60 of the voltage regulator and the contacts 70 and 71 of the current regulator 19 are in a closed condition at the same time, the point resistor 64 is short-circuited out of the energizing circuit of the field winding 23. Whenever the voltage regulator contacts 58 and 60 or the current regulator contacts 70 and 71 are open, the point resistor 64 is in series circuit with the field winding 23. Likewise it can be mentioned that whenever the lower voltage regulator contacts 59 and 61 are closed, the field winding 23 is substantially short-circuited for collapsing the field excitation.

From the construction and functioning of the components of the generating system 10 as thus far described, it will be seen that when the alternator 11 is not being driven, the load relay contacts 15 and 16 will be held open by the spring 43 to thereby disconnect the battery 14 from the alternator. When the alternator is placed in operation as by the starting of the vehicle driving engine, the load relay magnet coil 41 will be energized by the alternator through the control rectifier 20 and through portions of the power rectifier 12 to thereby automatically close the load relay contacts 15 and 16 and connect the external load in circuit with the alternator through the power rectifier 12.

To explain how the load relay magnet coil 41 is suitably energized from the alternator through the three cell control rectifier 20 and portions of the power rectifier 12, it is pointed out that the energizing circuit for this magnet coil extends from the direct current terminal 37 of the power rectifier 12 through the common ground G to one end of the magnet coil and then from the other end of the magnet coil through the conductor 48 and to the common terminal 47 of the control rectifier 20. From the three cells of the control rectifier 20, the circuit continues through the conductors 50, 51 and 52 to the inductor windings 24, 25 and 26 of the alternator 11 and from these inductor windings back to the direct current load terminal 37 through the rectifier cells 31 of the circuit arms 27, 28 and 29 of the power rectifier 12.

In this energizing circuit for the load relay magnet coil 41, as just above traced, it will be seen that the rectifier cells 30 of the circuit arms 27, 28 and 29 of the power rectifier 12 prevent energization of the magnet coil from the battery 14 while the load relay contacts 15 and 16 are closed. This use of the rectifier cells 30 as blocking cells in preventing energization of the magnet coil 41 from the battery 14 thus prevents the occurrence of a condition in which this magnet coil would be energized from the battery as soon as the load relay contacts 15 and 16 are closed and which condition, if permitted to occur, would take the control of the load relay away from the alternator.

From the energizing circuit above described, for the magnet coil 41 of the load relay 17, it will now also be seen that by the use of the relatively inexpensive three cell control rectifier 20 in conjunction with portions of the power rectifier 12, satisfactory energization of the load relay under the control of the alternator 11 is obtained. This satisfactory energization of the load relay magnet coil 41 from the alternator 11 with relatively reduced rectifier cost is further illustrated by the graph of Fig. 3 in which the wave form curve 75 illustrates the substantially constant voltage characteristic of this energizing current. The curve 75 represents two cycles of operation of the alternator 11 and was plotted relative to the zero value horizontal axis OX in accordance with voltage values shown by an oscilloscope to exist in the load relay magnet coil circuit during the functioning of the generating system 10.

Another important feature of this invention is embodied in the generating system 10 and comprises a signal device here shown as an incandescent electric lamp 78 connected across the load relay contacts 15 and 16, and a manual switch 79 controlling the circuit of the signal lamp 78 and forming a part of a manually operable ignition switch 80. Assuming that the switch 79 has been closed by a manual closing of the ignition switch 80, the signal lamp 78 will be lighted whenever the load relay contacts 15 and 16 are open and will be extinguished whenever these load relay contacts are closed.

The extinguished condition of the signal lamp 78 will, therefore, indicate a closed condition of the charging circuit for the battery 14, and the lighting of the signal lamp will represent an open-circuit condition of the battery charging circuit. Thus the signal lamp 78 as here provided accomplishes the very useful purpose of visibly indicating whether or not the load relay contacts are closed for charging the battery 14 and this useful purpose is accomplished at very little expense and without need for any additional rectifiers or automatic relay type switches as heretofore needed in various generating systems.

The generating system 10 has been referred to above as including the auxiliary relay 21. This auxiliary relay is a conventional electromagnetic switch comprising a magnet frame 82 having an energizing coil 83, and cooperating stationary and movable switch contacts 84 and 85 which are urged toward a normally closed condition by a tension spring 87 effective on the armature 88. The auxiliary relay contacts 84 and 85 are located in the energizing circuit by which an auxiliary power device, such as the motor 89, is connected with the battery 14. This energizing circuit for the motor 89 is also controllable by a manually operable switch 86.

The motor 89 is here shown as driving a pump 90 or the like, which is also adapted to be driven directly from the vehicle engine through a belt 91 and a drive pulley 92 embodying an overrunning clutch. The pump 90 can be, for example, an air compressor for supplying air under pressure for actuation of pneumatic vehicle brakes.

When the alternator 11 is being driven by the vehicle engine, the auxiliary relay magnet coil 83 will be energized from the battery 14 through an energizing circuit which includes the conductor 93 and the then closed load relay contacts 15 and 16. The energized condition of the auxiliary relay coil 83 maintains the contacts 84 and 85 open to thereby deenergize the electric motor 89, inasmuch as the pump 90 is then being driven by the vehicle engine and operation of the electric motor is not needed. When the vehicle engine is stopped and the terminal voltage of the alternator 11 drops to a zero value, the load relay contacts 15 and 16 open automatically to thereby deenergize auxiliary relay magnet coil 83. The deenergization of the latter coil permits the contacts 84 and 85 to be closed by the spring 87 to thereby close the energizing circuit for the electric motor 89 whereupon the pump 90 will be driven by this motor.

Figure 2:
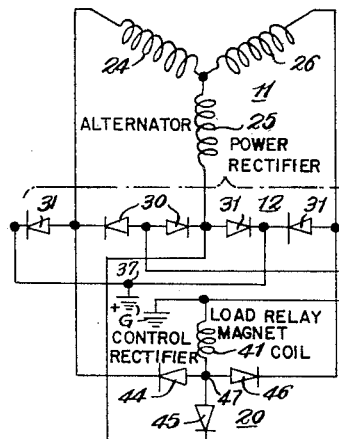
Fig. 2 is a schematic wiring diagram of the generating system of Fig. 1.

As has been indicated above, the diagram of Fig. 2 is a schematic wiring diagram showing the same alternator-rectifier generating system as is shown in Fig. 1, and hence, the same reference characters have been used in Fig. 2 to designate the same corresponding parts. From this schematic diagram, it can be seen that the energizing circuit for the load relay magnet coil 41 includes the three rectifier cells 44, 45 and 46 of the control rectifier 20 and the three cells 31 of the power rectifier 12. This schematic wiring diagram again illustrates the fact that the cells 30 of the power rectifier 12 are not contained in the energizing circuit for the magnet coil 41 but serve as blocking cells for preventing energization of this magnet coil from the battery 14 when the load relay contacts 15 and 16 are closed.

Figure 4:
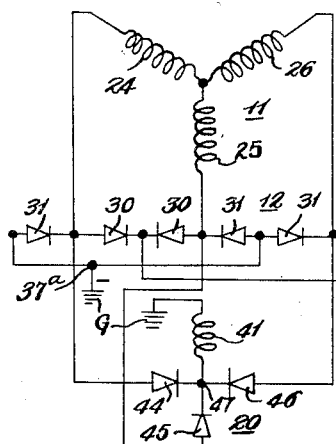
Fig. 4 is a schematic wiring diagram illustrating the same generating system as Fig. 2 but as a negative-ground form of the system.

The schematic wiring diagram of Fig. 4 shows an alternator-rectifier generating system 95 which is substantially the same in structure and function to the above-described generating system 10 but which is a negative-ground type of system. In this negative-ground system 95, the positive and negative direct current terminals of the power rectifier are designated 36$^a$ and 37$^a$, and the positive and negative terminals of the battery 14 are designated 33$^a$ and 38$^a$.

Figure 3:
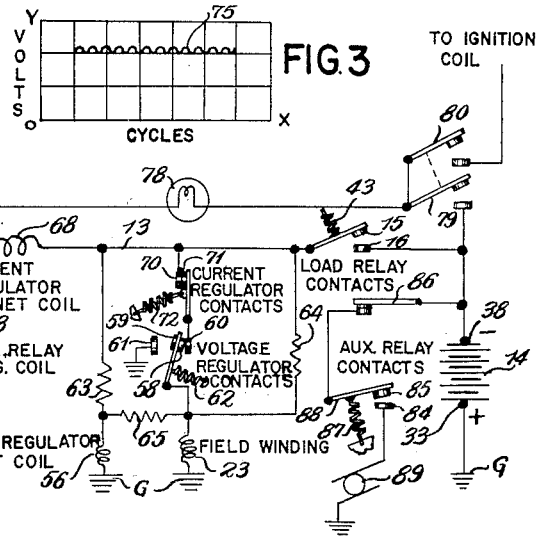
Fig. 3 is a graph illustrating the wave form obtained in the generating system of Fig. 1 for the energizing current supplied to the load relay magnet coil.

In the system 95, all of the rectifier cells of the power rectifier 12 are shown in a position reversed from Fig. 2 inasmuch as this system is of the negative ground type. Likewise, in the control rectifier 20, the three cells 44, 45 and 46 are shown in a reversed position from that of Figs. 1 and 2. The graph 75 of Fig. 3 illustrates the wave form of the energizing current of the load relay magnet coil 41 in the negative-ground system of Fig. 4.

Figure 5:
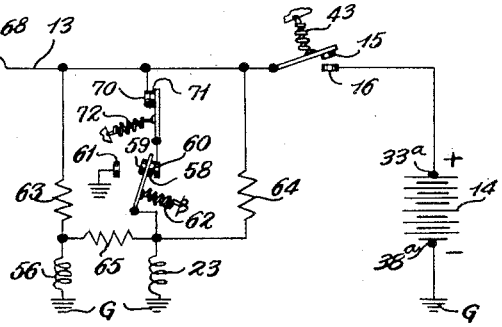
Figs. 5, 7, 9 and 11 are schematic wiring diagrams showing generating systems similar to that of Figs. 1 and 2 but having different energizing circuits for the load relay magnet coil.
Figure 5:
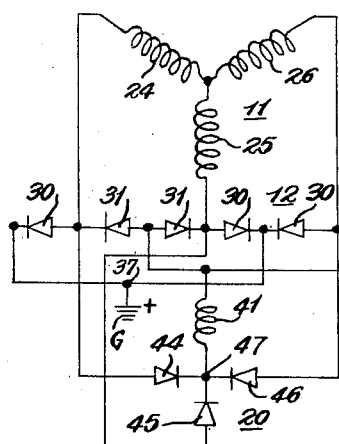

Fig. 5 of the drawings shows an alternator-rectifier generating system 97 which is similar to the systems of Figs. 2 and 4 but in which a somewhat different form of energizing circuit is provided for the load relay magnet coil 41. In this system 97, one end of the load relay coil 41 is connected with the common terminal 47 of the control rectifier 20, as is also the case in Figs. 2 and 4, but the other end of this magnet coil is connected with the negative direct current terminal 36 of the power rectifier 12 through the circuit arm 98 of the latter.

Figure 6:
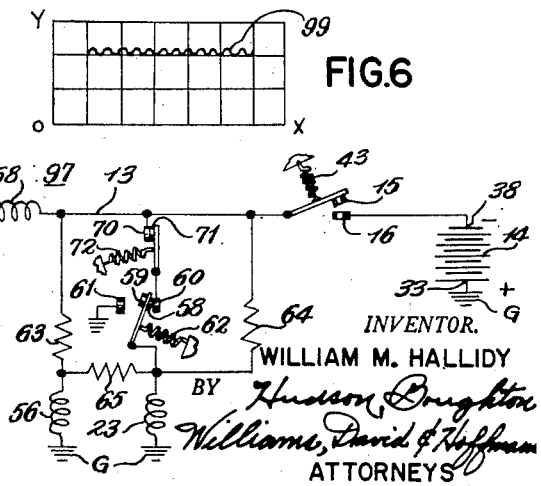
Figs. 6, 8, 10 and 12 are graphs illustrating the wave form for the relay magnet coil current in the generating systems of Figs. 5, 7, 9 and 11, respectively.

With this form of energizing circuit for the load relay magnet coil 41, an energizing current is obtained in the coil circuit having a wave form which is illustrated by the graph 99 of Fig. 6.

Figure 7:
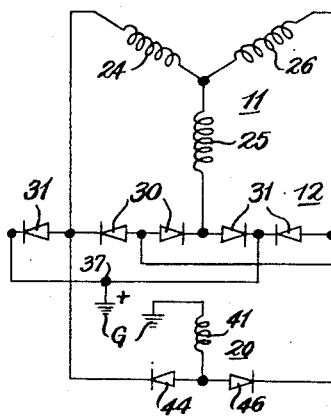
Figure 9:
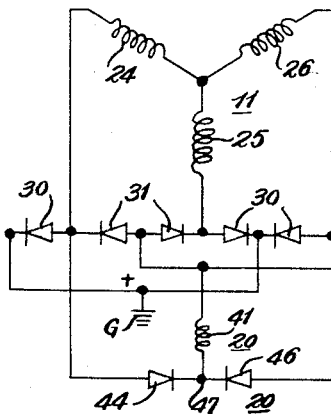

Figs. 7 and 9 of the drawings show alternator-rectifier generating systems 100 and 101 which are similar to the generating systems 10 and 97, respectively, of Figs. 2 and 5 but employ a control rectifier 20 which consists of only two rectifier cells 44 and 46. As here shown, the systems 100 and 101 are both of the positive-ground form.

In the generating system 100 of Fig. 7, the energizing circuit for the load relay magnet coil 41 includes the control rectifier cells 44 and 46 operating in combination with the three rectifier cells 31 of the power rectifier 12. The rectifier cells 30 of the power rectifier 12 here again function as blocking cells for preventing energization of the load relay coil 41 from the battery 14.

Figure 8:
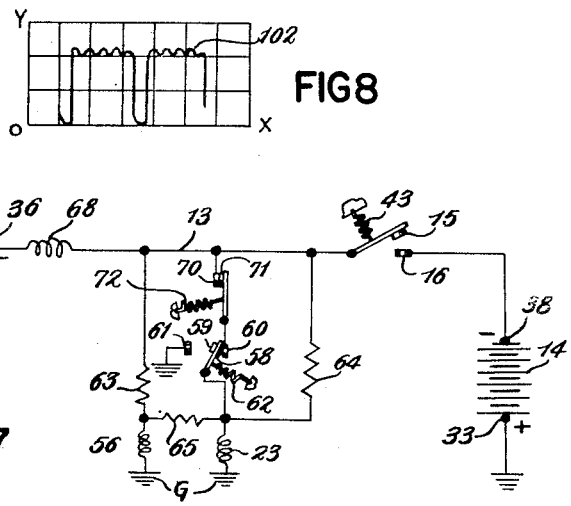

In the graph of Fig. 8, the curve 102 illustrates the wave form of the energizing current obtained in the load relay coil 41 of the generating system 100. It will be seen from this curve that by using the relatively inexpensive two-cell control rectifier 20 in combination with the three rectifier cells 31 of the power rectifier 12, energizing current of a suitable voltage will be obtained in the magnet coil 41 for approximately five-sixths of the generating cycle of the three-phase alternator 11.

In the generating system 101 of Fig. 9, the ends of the load relay coil 41 are connected with the common direct-current terminal 47 of the control rectifier 20 and with the negative direct current terminal 36 of the power rectifier 12 through the circuit arm 103 of the latter.

Figure 10:
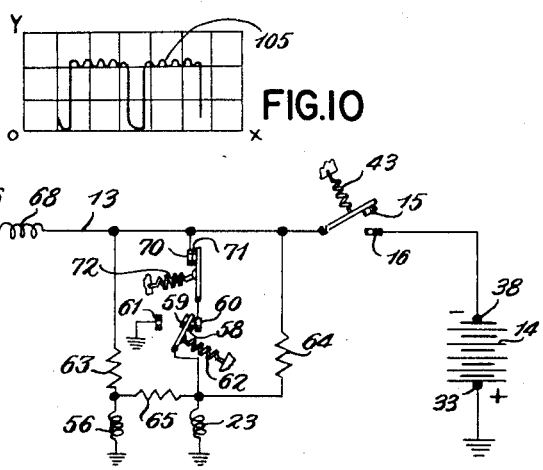

In the graph of Fig. 10, the curve 105 represents the wave form for the energizing current obtained in the load relay magnet coil 41 during the functioning of the generating system 101 of Fig. 9.

Figure 11:
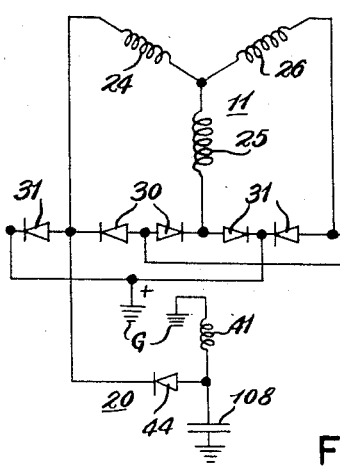

In Fig. 11 of the drawings, a generating system 107 is shown which is similar to the generating system 100 of Fig. 7 but in which the control rectifier 20 comprises a single rectifier cell 44. In the system 107 the single rectifier cell 44 of the control rectifier 20 is contained in the energizing circuit of magnet coil 41 in combination with the three cells 31 of the power rectifier 12. A capacitor 108 of suitable value is used in the system of Fig. 7 and is connected across the terminals of the load relay magnet coil 41.

Figure 12:
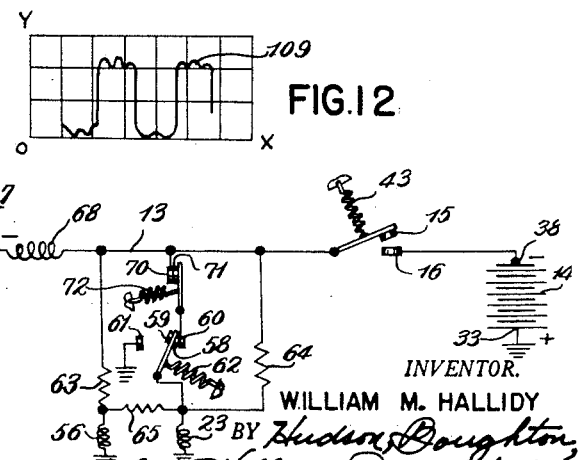

In the graph of Fig. 12, the curve 109 illustrates the wave form of the energizing current obtained in the load relay magnet coil 41 during the functioning of the generating system 107.

Figs. 13, 14, 16 and 18 show alternator-rectifier generating systems 110, 111 and 112 which are similar to the generating system 10 but in which no control rectifier, as such, is used. In the systems 110, 111 and 112, the energizing circuit for the load relay magnet coil 41 includes a portion of the power rectifier 12 such that energizing current for this magnet coil will be supplied thereto from the alternator 11 through the included portion of the power rectifier without need for any control rectifier. One end of the magnet coil 41 is connected with the direct current terminal 37 of the power rectifier 12 through the common ground G and the other end is connected with the inductor winding 25 of the alternator through the conductor 117.

Figure 13:
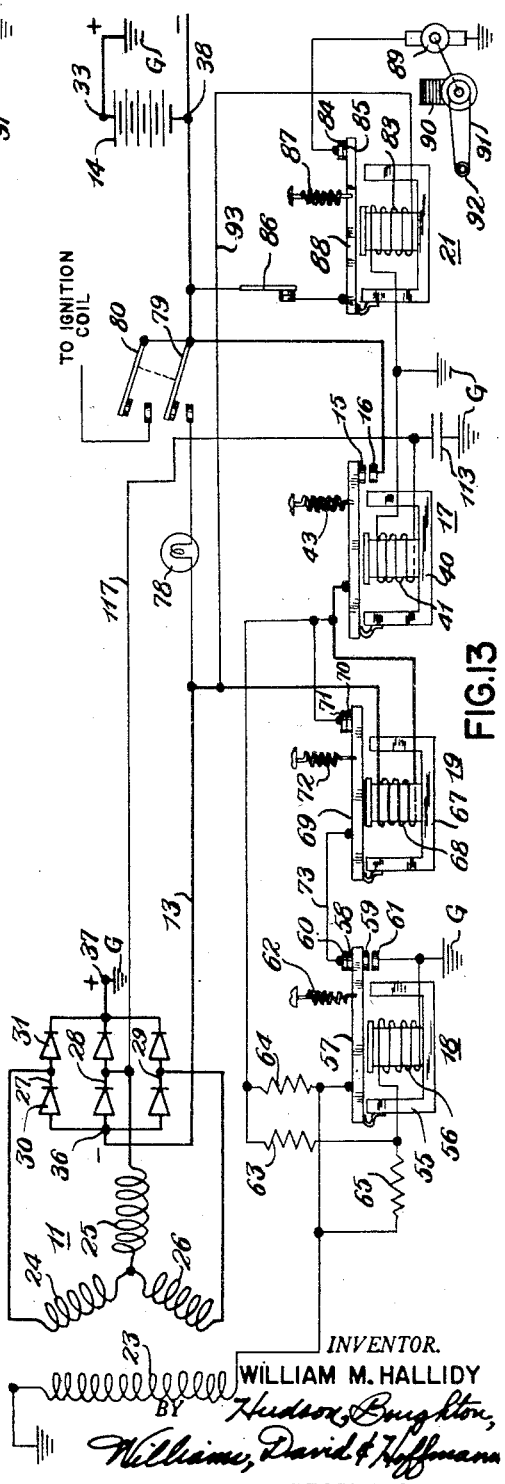
Fig. 13 is a wiring diagram similar to that of Fig. 1 but illustrating a generating system in which the control rectifier has been eliminated.
Figure 14:
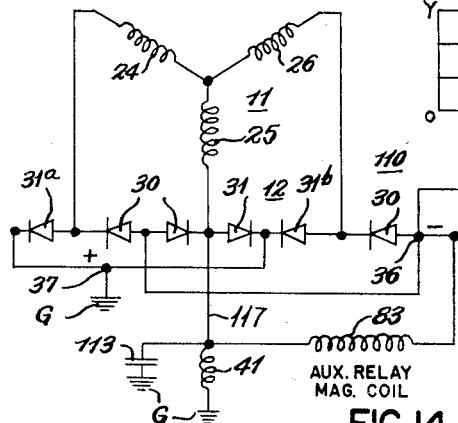
Fig. 14 is a schematic wiring diagram of the generating system of Fig. 13.

Fig. 14 shows the same generating system as Fig. 13 but illustrates the system in a schematic wiring diagram. All of the components employed in the generating system 110 of Figs. 13 and 14 are the same as the components of the generating system 10 except for the omission of the control rectifier, and such corresponding components have been designated by the same reference characters. In each of the systems 110, 111 and 112, a capacitor 113 is connected across the terminals of the load relay magnet coil 41.

Figure 15:
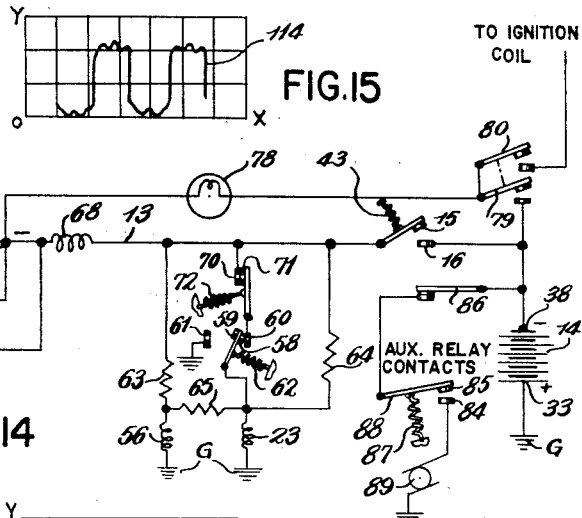
Fig. 15 is a graph illustrating the wave form obtained in the generating system of Fig. 13 for the energizing current supplied to the load relay magnet coil.
Figure 17:
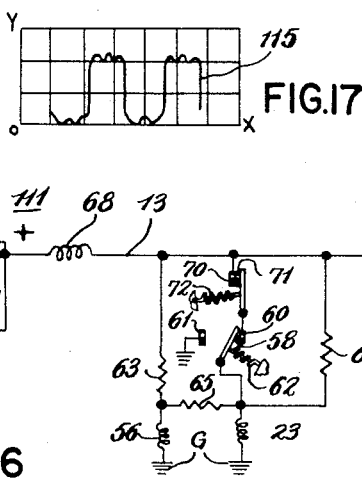
Fig. 17 is a graph illustrating the wave form for the relay magnet coil current in the generating system of Fig. 16.
Figure 18:
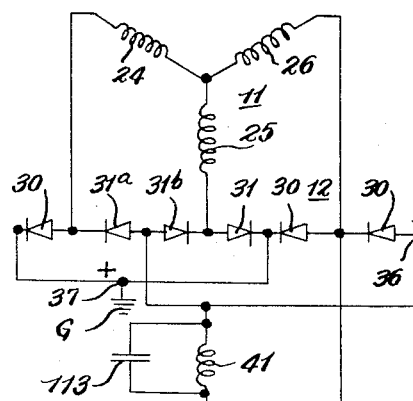
Fig. 18 is a schematic wiring diagram showing a generating system similar to that of Figs. 13 and 14 but having a different energizing circuit for the load relay magnet coil.
Figure 19:
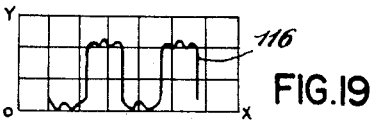
Fig. 19 is a graph illustrating the wave form for the relay magnet coil circuit in the generating system of Fig. 19.

In the graphs of Figs. 15, 17 and 19, curves 114, 115, and 116 are shown which represent the wave form of the energizing current obtained in the load relay magnet coil 41 during the functioning of these respective generating systems 110, 111 and 112.

Figure 16:
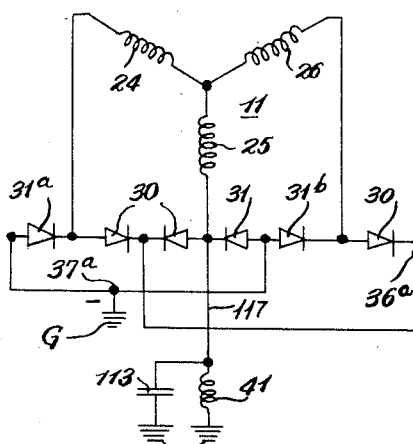
Fig. 16 is a schematic wiring diagram illustrating the same generating system as Fig. 14 but as a negative-ground form of the system.

In each of the systems 110, 111 and 112, it will be seen that two rectifier cells 31a and 31b of the power rectifier 12 are contained in the energizing circuit for the magnet coil 41 and that the rectifier cells 30 of the power rectifier serve as blocking cells for preventing energization of the magnet coil 41 from the battery 14. The generating system 111 of Fig. 16 is substantially the same as the generating system 110 of Figs. 13 and 14 but is shown in the form of a negative-ground system.

For purposes of simplification, the auxiliary relay 21 and its circuit connections, as well as the signal lamp 78 and the ignition switch 80, have been omitted in the schematic diagrams of Figs. 4, 5, 7, 9, 11, 16 and 18.

From the accompanying drawings and the foregoing detailed description, it will now be readily understood that this invention provides an alternator-rectifier generating system of a kind suitable for use on vehicles and in which energization of a load relay magnet coil is obtained from the alternator such that the load relay is under the control of the alternator, and that this desired result is obtained in a very practical and inexpensive manner by utilizing in all forms of the generating system, an energizing circuit for the load relay magnet coil which includes at least a portion of the power rectifier. It will now also be understood that in accordance with the teaching of this invention, a control rectifier can be used in the load relay coil energizing circuit, but under the present invention such control rectifier can be of a simplified and inexpensive form and satisfactory energization of the load relay magnet coil will still be obtained.

Additionally, it will now be understood that this invention provides an alternator-rectifier type of vehicle generating system in which novel and inexpensive signal means indicates the open- or closed-circuit condition of the battery charging circuit, as controlled by the load relay.

Although the generating systems of the present invention have been illustrated and described herein to a somewhat detailed extent, it will be understood, of course, that the invention is not to be regarded as being limited correspondingly in scope but includes all changes and modifications coming within the terms of the claims hereof.

Having thus described my invention, I claim:

1. In an alternator-rectifier generating system, an alternator, a power rectifier, an external direct-current load circuit connected with said alternator through said power rectifier and including a storage battery to be charged, a load relay having a magnet coil and series switch contacts controlling said load circuit, said contacts being normally open and adapted to be closed in response to energization of said magnet coil, and circuit means connecting said magnet coil with said alternator through only a portion of said power rectifier for causing such energization of said magnet coil and closing and opening of said contacts in response to operation of the alternator.

2. In an alternator-rectifier generating system, a three-phase alternator having a field winding and load terminals, a three-phase full-wave power rectifier, an external direct-current load circuit connected with said load terminals through said power rectifier, a load relay having a magnet coil and series switch contacts controlling said load circuit, said contacts being normally open and adapted to be closed in response to energization of said magnet coil, and circuit means connecting said magnet coil with said load terminals through only a portion of said power rectifier for causing such energization of said magnet coil and closing and opening of said contacts in response to operation of the alternator.

3. In an alternator-rectifier generating system, an alternator, a power rectifier, an external direct-current load circuit connected with said alternator through said power rectifier and including a storage battery to be charged, a load relay having a magnet coil and series switch contacts controlling said load circuit, said contacts being normally open and adapted to be closed in response to energization of said magnet coil, and circuit means connecting said magnet coil with said alternator through one portion of said rectifier, another portion of said rectifier being effective to prevent energization of said magnet coil from said battery through said switch contacts when the latter have been closed by the action of said alternator.

4. In an alternator-rectifier generating system, a three-phase alternator, a multiple-cell power rectifier, an external direct-current load circuit connected with said alternator through said power rectifier and including a storage battery to be charged, a load relay having a magnet coil and series switch contacts controlling said load circuit, said contacts being normally open and adapted to be closed in response to energization of said magnet coil, and circuit means connecting said magnet coil with said alternator through at least one cell of said power rectifier to provide direct-current energization of said coil from said alternator and prevent energization in the direction of said direct-current energization from a direct-current source in the D. C. load circuit.

5. In an alternator-rectifier generating system, a three-phase alternator, a full-wave power rectifier having direct-current load terminals and comprising three circuit arms in parallel and containing rectifier cells, said alternator having inductor phase windings connected with the respective circuit arms of said power rectifier, an external direct-current load circuit connected with said load terminals, a load relay having a magnet coil and series switch contacts located in and controlling said load circuit, said switch contacts being normally open and adapted to be closed in response to energization of said magnet coil, and circuit means connecting said magnet coil in circuit with said alternator through only a portion of said rectifier which comprises at least one of said circuit arms.

6. In an alternator-rectifier generating system, a three-phase alternator, a full-wave power rectifier having direct-current load terminals and comprising three circuit arms in parallel and each containing a pair of rectifier cells, said alternator having inductor phase windings connected with the respective circuit arms at a point between the pair of cells of said circuit arms, an external direct-current load circuit connected with said load terminals, a load relay having a magnet coil and series switch contacts controlling said load circuit, said switch contacts being normally open and adapted to be closed in response to energization of said magnet coil, and circuit means connecting said magnet coil in circuit with said alternator through only a portion of said rectifier comprising at least one cell of at least one of said circuit arms.

7. In an alternator-rectifier generator system, a three-phase alternator having inductor windings for the respective phases, a full-wave power rectifier having direct-current terminals and comprising three parallel circuit arms each containing a pair of rectifier cells, the inductor windings of said alternator being connected respectively with said circuit arms at a point between the rectifier cells thereof, an external direct-current load circuit connected with said load terminals, a load relay having a magnet coil and series switch contacts located in and controlling said load circuit, said switch contacts being normally open and adapted to be closed in response to energization of said magnet coil, an auxiliary rectifier comprising at least one rectifier cell, and circuit means connecting said magnet coil in circuit with said alternator through said one cell of said auxiliary rectifier and through a portion only of said power rectifier comprising at least one cell of at least one of said circuit arms.

8. An alternator-rectifier system as defined in claim 7 in which said auxiliary rectifier consists of three rectifier cells in parallel having one common terminal on one side thereof and on the other side thereof having three individual terminals respectively connected with the inductor windings of said three phases, said magnet coil being connected in circuit with said alternator by having one end thereof electrically connected with said one common terminal and its other end electrically connected with one of said direct-current terminals.

9. An alternator-rectifier system as defined in claim 7 in which said auxiliary rectifier consists of two rectifier cells in parallel having one common terminal on one side thereof and on the other side thereof having two individual terminals connected respectively with the inductor windings of two phases of said alternator, said magnet coil being connected in circuit with said alternator by having one end thereof electrically connected with said one common terminal and its other end electrically connected with one of said direct-current terminals.

10. An alternator-rectifier system as defined in claim 7 in which said auxiliary rectifier consists of a single rectifier cell only, and in which said magnet coil is connected in circuit with said alternator by having one end thereof connected with one of said direct-current terminals and its other end connected with one of the phase windings of the alternator through said single rectifier cell.

11. An alternator-rectifier system as defined in claim 7 in which said auxiliary rectifier consists of a single rectifier cell only, and in which a capacitor is connected across the ends of said magnet coil, said magnet coil being connected in circuit with said alternator by having one end thereof connected with one of said direct-current terminals and its other end connected with one of the phase windings of the alternator through said single rectifier cell.

12. In an alternator-rectifier generating system, a three-phase alternator, a full-wave power rectifier having direct-current load terminals and comprising three circuit arms in parallel and each containing a pair of rectifier cells, said alternator having inductor phase windings connected with the respective circuit arms at a point between the pair of cells of said circuit arms, an external direct-current load circuit connected with said load terminals, and a load relay having a magnet coil and series switch contacts located in and controlling said load circuit, said magnet coil being energized from said alternator by having one end connected with one of said load terminals and its other end connected directly with one of the phase windings of the alternator.

13. An alternator-rectifier system as defined in claim 12 and which includes a capacitor connected across the ends of said magnet coil.

14. In a vehicle electrical system, an ignition switch, a three-phase alternator, a multiple-cell three-phase full-wave rectifier, a storage battery, a charging circuit connecting said battery with said alternator through said rectifier, an electromagnetic switch device having a magnet coil and normally open series switch contacts located in and controlling said charging circuit and adapted to be closed in response to energization of said magnet coil, circuit means connecting said magnet coil with said alternator through a portion only of said rectifier comprising at least one of the rectifier cells, another portion of said rectifier being effective to prevent energization of said magnet coil from said battery through said series contacts when the latter are closed, and a signal lamp connected across said contacts to be energized from said battery when said contacts are open in indication of the open-circuit condition of said charging circuit, said ignition switch having signal lamp control contacts in series circuit with said signal lamp.

15. In a vehicle electrical system, an alternator, a rectifier means, a storage battery to be charged, a load circuit connecting said battery with said alternator through said rectifier means, a load relay comprising a magnet coil and normally open switch contacts controlling said load circuit and adapted to be closed in response to energizing said magnet coil, circuit means for energization of said magnet coil from said alternator through only a portion of said rectifier and independently of said battery, and a signal lamp connected across said switch contacts to be energized when said contacts are open in indication of the open-circuit condition of said load circuit.

References Cited in the file of this patent

UNITED STATES PATENTS

| 374,673 | Griscom | Dec. 13, 1887 |
| 1,741,691 | Fenton | Dec. 31, 1929 |
| 2,520,689 | Niemi | Aug. 29, 1950 |
| 2,557,298 | Leece et al. | June 19, 1951 |
| 2,646,543 | Gilchrist | July 21, 1953 |
| 2,651,749 | Weber | Sept. 8, 1953 |

FOREIGN PATENTS

| 556,170 | France | Apr. 9, 1923 |